(12) United States Patent
Sakurai

(10) Patent No.: US 6,563,496 B1
(45) Date of Patent: May 13, 2003

(54) CUT-OFF ADJUSTING APPARATUS

(75) Inventor: Hisao Sakurai, Saitama (JP)

(73) Assignee: Sony Corporation, Tokyo (JP)

( * ) Notice: Subject to any disclaimer, the term of this patent is extended or adjusted under 35 U.S.C. 154(b) by 338 days.

(21) Appl. No.: 09/615,850

(22) Filed: Jul. 14, 2000

(30) Foreign Application Priority Data

Jul. 14, 1999 (JP) .......................................... 11-199919

(51) Int. Cl.⁷ ................................................ H14N 5/68
(52) U.S. Cl. ...................... 345/379; 348/377; 315/380; 315/382.1
(58) Field of Search ................................ 348/379, 377, 348/378, 380; 315/380, 381, 382.1, 383, 387, 388, 389, 399, 402; H04N 5/68

(56) References Cited

U.S. PATENT DOCUMENTS

| | | | | |
|---|---|---|---|---|
| 4,463,385 A | * | 7/1984 | Parker | 348/379 |
| 5,200,820 A | * | 4/1993 | Gharavi | 375/240.12 |
| 5,293,101 A | * | 3/1994 | Sakurai | 315/383 |
| 5,394,188 A | * | 2/1995 | Ohira | 348/327 |
| 5,892,544 A | * | 4/1999 | Ikegami et al. | 348/380 |

* cited by examiner

Primary Examiner—John Miller
Assistant Examiner—Brian Yenke
(74) Attorney, Agent, or Firm—Jay H. Maioli (57) ABSTRACT

A cut-off adjusting apparatus in which a signal source for detecting cathode current is not required, the cost can be reduced, the cathode current can be detected with high precision, and the correction corresponding to time-variation can be performed with high precision. Includes a controller in which when an enforced adjusting mode is set, during a vertical period a control signal is output to a video amplifier to output such a signal that no video signal is contained in the output and the pedestal level is the black level irrespective of the input video signal, and wherein an averaged cathode current at this time is detected. Subsequently, a control signal is output to the video amplifier to output such a signal that the brightness level is set to gray, an averaged cathode current at this time is detected, the differential value therebetween is determined, the measurement value thereof and an initial set value are compared with each other, and a control signal is output to a third terminal of the cut-off control amplifier so that the measurement value is equal to the initial set value.

50 Claims, 5 Drawing Sheets

(PRIOR ART)

FIG. 5A $S_{REF}$　　CATHODE CURRENT DETECTING REFERENCE SIGNAL

FIG. 5B

CATHODE POTENTIAL DIAGRAM

FIG. 5C

VOLTAGE WAVEFORM OF CURRENT DETECTING RESISTOR

ONE HORIZONTAL PERIOD SECTION

A/D CONVERSION IS CARRIED OUT IN THIS SECTION (PRIOR ART)

FIG. 6A

VERTICAL PERIOD SYNCHRONOUS SIGNAL

FIG. 6B

CATHODE CURRENT DETECTION WAVEFORM

CUT-OFF ADJUSTING APPARATUS

BACKGROUND OF THE INVENTION

1. Field of the Invention

The present invention relates to a cut-off adjusting apparatus for a display using CRT (Cathode Ray Tube), and particularly to a circuit for detecting and correcting cathode current.

2. Description of the Related Art

The cut-off adjustment is generally defined as a critical bias voltage adjustment of a cathode voltage to a first grid voltage of CRT which is a boundary at which a raster is deleted or displayed from a screen. In other words, the cut-off adjustment is defined as such a black level adjustment that the dispersion of a cut-off voltage is absorbed and the black level is kept constant.

The display using CRT has such a problem as variation of cathode current due to time lapse, specifically brightness variation.

As a countermeasure to the above problem has been known a cut-off adjusting apparatus for receiving a specific signal for detecting cathode current to detect the cathode current corresponding to the signal and adjusting the cathode current, thereby performing the cut-off adjustment.

Figure 4:
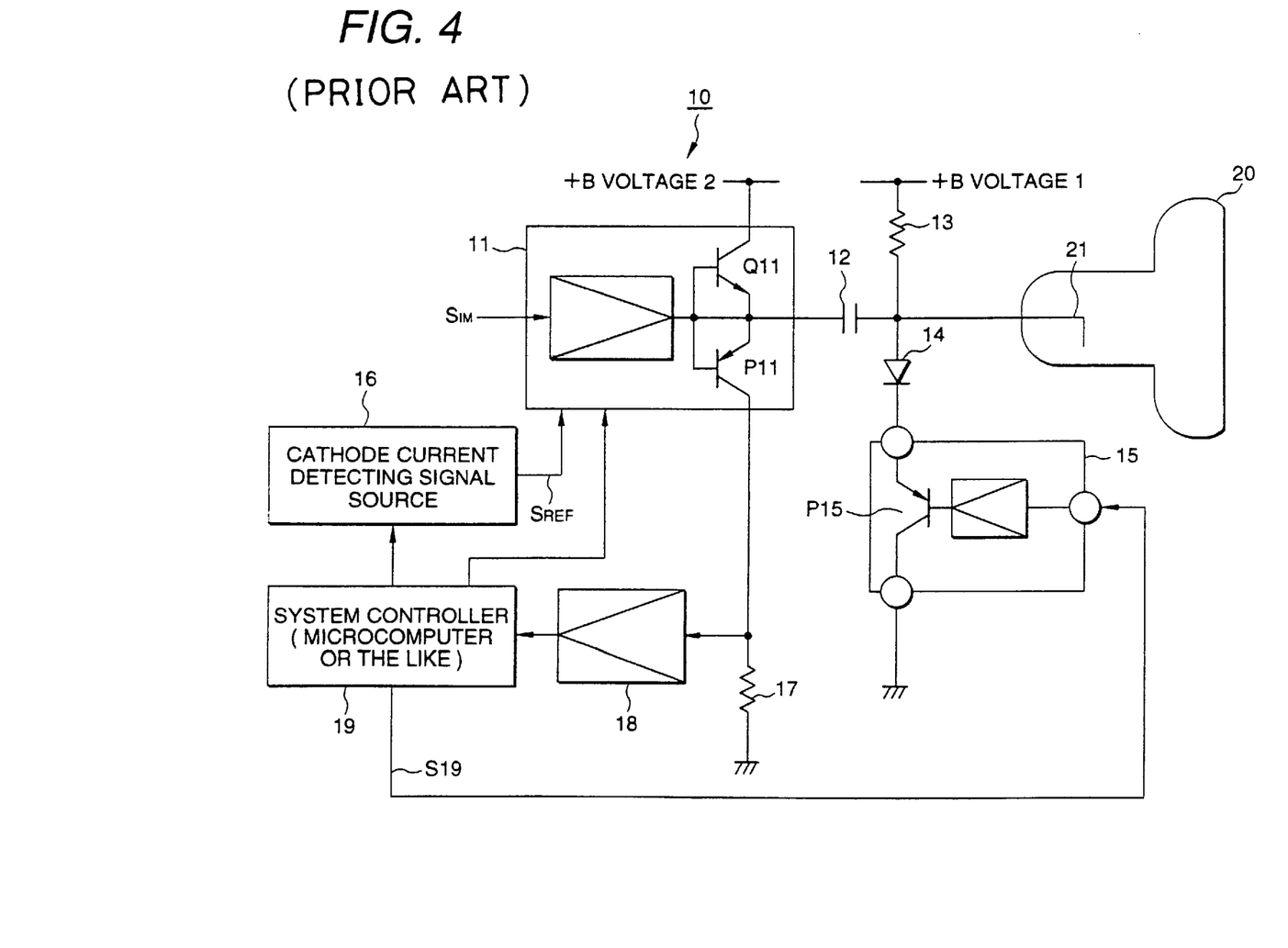
FIG. 4 is a circuit diagram showing the construction of a conventional cut-off adjusting apparatus.

FIG. 4 is a circuit diagram showing the construction of a conventional cut-off adjusting apparatus.

As shown in FIG. 4, the cut-off adjusting circuit 10 comprises a video amplifier 11, a cathode voltage clamp capacitor 12, a cathode voltage clamp resistor 13, a diode 14, a cut-off control amplifier 15 for setting a cut-off voltage of CRT 20, a cathode current detecting signal source 16, a cathode current detecting resistor 17, an analog/digital converter (ADC) 18 and a system controller 19 such as a microcomputer.

In the cut-off adjusting apparatus 10, a video signal SIM is input to the video amplifier 11 to be amplified with a predetermined gain, the DC component thereof is cut in the capacitor 12 and only the alternating component is transmitted to the cathode 21 of CRT 20.

At this time, the DC component for driving the cathode 21 of CRT 20 is reproduced in a DC reproducing circuit formed of the diode 14, etc. and supplied to the cathode.

Figure 5A:
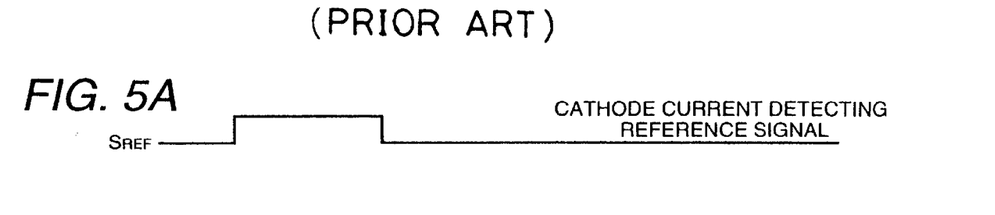
FIG. 5 is a timing chart obtained through observation at the horizontal period to explain the cathode current detection operation of the conventional cut-off adjustment apparatus.
Figure 5B:
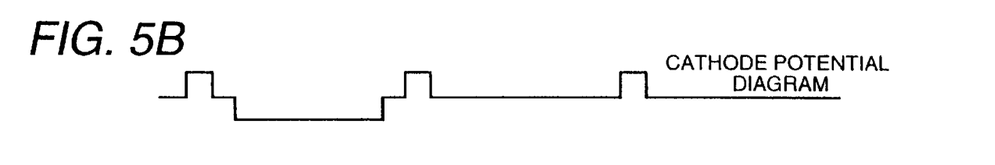

When the cathode current detection is carried out to correct the cathode current and the cut-off adjustment is carried out, a cathode current detecting reference signal SREF as shown in FIG. 5A is supplied to the video amplifier 11 by the signal source 16 whose driving operation is controlled by the system controller 19. The potential of the cathode 21 at this time is shown in FIG. 5B.

Figure 5C:
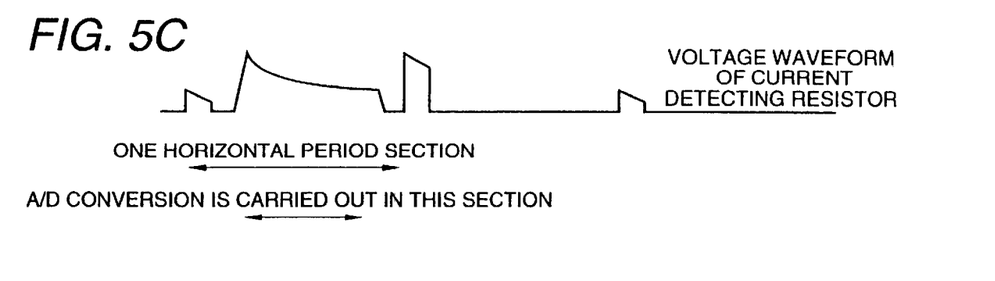
Figure 6A:
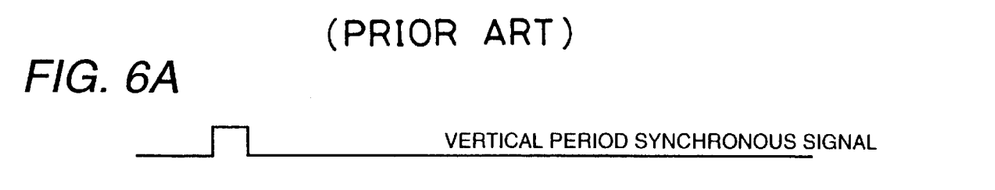
FIG. 6 is a timing chart obtained through observation at the vertical period to explain the cathode current detection operation of the conventional cut-off adjusting apparatus.

As shown in FIG. 5, the detection of the cathode current is carried out within a video signal section of a horizontal period, and it is shown in FIG. 6 if it is observed at a vertical period.

The cathode current thus detected is converted to a voltage value by the cathode current detecting resistor 17, and then converted to digital data by ADC 18.

In the system controller 19 for controlling the display set, the digital value is compared with the digital value by ADC 18 to detect the error therebetween, and the base potential of a pnp type transistor P15 connected between the cathode of the diode 14 and the ground line is controlled on the basis of a control signal S19 so that the error is nullified.

FIG. 5 representatively shows one of three primary colors R(red), G(green), B(blue). FIG. 5C shows the voltage waveform in the current detecting resistor 17.

Figure 6B:
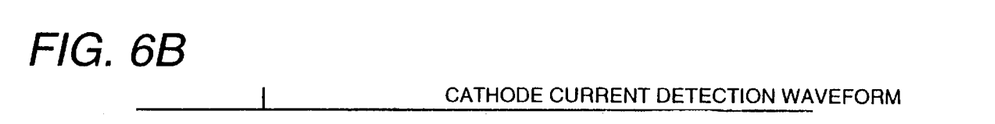

FIG. 6 shows a state in which the video signal is omitted. As shown in FIG. 6, only a part of the detection signal appears as shown in FIG. 6B when observed at the vertical period.

However, the cut-off adjusting apparatus described above has the following disadvantages.

1) A cathode current detecting signal source is needed, and thus hardware therefor is needed, resulting in rise-up of the cost.

2) It is practical in a region having a relatively low horizontal deflection period, specifically below 30 kHz and at a specific frequency, however, in a region having a high horizontal deflection period, that is, above 30 kHz and in a system to which the frequency is not specified, an adverse effect such as dynamic focus remarkably appears as shown in FIG. 5C, so that it is difficult to detect the cathode current.

3) For the reason of 2), the error of the current value detected is large and as a result a large error occurs in the A/D conversion result, so that it is difficult to perform high-precision control. Therefore, it is difficult to perform correction control corresponding to the time variation even when this circuit is used.

4) The current detection is carried out by measuring a specific one point of brightness level. Therefore, when leakage of current occurs in the cathode, an error occurs in the measurement value and it may serve as a control error to induce variation of brightness.

The present invention has been implemented, and an object thereof is to provide a cut-off adjusting apparatus which needs no signal source for detecting cathode current, and can aim to reduce the cost, detect the cathode current with high precision and perform the correction corresponding to the time variation with high precision.

SUMMARY OF THE INVENTION

In order to attain the above object, according to the present invention, a cut-off adjusting apparatus for adjusting the cut-off of a display using a cathode ray tube, comprises: video signal processing means which can adjust at least contrast on the basis of a first control signal, and adjust the pedestal level of a video signal to the black level irrespective of input of the video signal and output the signal; a clamp capacitor having a first electrode connected to the output terminal of the video signal processing means and a second electrode connected to a cathode of the cathode ray tube; a rectifying element provided so that a forward direction is set from the connection point between the second electrode of the clamp capacitor and said cathode toward the reference potential; cut-off control means for adjusting the amount of current discharging from the clamp capacitor to the reference potential in accordance with a second control signal to keep the cathode voltage to a predetermined voltage; and current measuring means for outputting the first control signal to the video signal processing means to output a signal of black level when receiving an enforced adjustment instruction, and measuring the current flowing from the clamp capacitor through the rectifying element to the reference potential as a cathode current at the time of the black level signal.

According to the present invention, a cut-off adjusting apparatus for adjusting the cut-off of a display using a cathode ray tube, comprises: video signal processing means which can adjust at least contrast on the basis of a first control signal, and adjust the pedestal level of a video signal to the black level irrespective of input of the video signal and output the signal; a clamp capacitor having a first electrode connected to the output terminal of the video signal processing means and a second electrode connected to a cathode of the cathode ray tube; a rectifying element provided so that a forward direction is set from the connection point between the second electrode of the clamp capacitor and the cathode toward the reference potential; cut-off control means for adjusting the amount of current discharging from the clamp capacitor to the reference potential in accordance with a second control signal to keep the cathode voltage to a predetermined voltage; and current measuring means for outputting the first control signal to the video signal processing means to output a signal of black level when receiving an enforced adjustment instruction, measuring the current flowing from the clamp capacitor through the rectifying element to the reference potential as a cathode current at the time of the black level signal, comparing the current value thus measured with a predetermined set value, and outputting the second control signal to said cut-off control means so that the measured value is equal to the set value.

According to the present invention, a cut-off adjusting apparatus for adjusting the cut-off of a display using a cathode ray tube, comprises: video signal processing means which can adjust contrast on the basis of a first control signal, adjust the pedestal level of a video signal to the black level irrespective of input of the video signal and output the signal, adjust brightness on the basis of a second control signal, and adjust the pedestal level to gray level and output the signal; a clamp capacitor having a first electrode connected to the output terminal of the video signal processing means and a second electrode connected to a cathode of said cathode ray tube; a clamp resistor connected between a predetermined power source and the connection point between the second electrode of the clamp capacitor and the cathode; a rectifying element provided so that a forward direction is set from the connection point between the second electrode of the clamp capacitor and the cathode toward the reference potential; cut-off control means for adjusting the amount of current discharging from the clamp capacitor to the reference potential in accordance with a third control signal to keep the cathode voltage to a predetermined voltage; and current measuring means for outputting the first control signal to the video signal processing means to output a signal of black level when receiving an enforced adjustment instruction, measuring the current flowing from the clamp capacitor through the rectifying element to the reference potential as a cathode current at the time of the black level signal, holding the current value thus measured, outputting the first and second control signals to the video signal processing means to output a signal of gray level, measuring the current flowing from the clamp capacitor through the rectifying element to the reference potential as a cathode current at the time of the gray level signal, and taking the difference between the measured current value at the gray level time and the held measured current value at the black level time.

According to the present invention, a cut-off adjusting apparatus for adjusting the cut-off of a display using a cathode ray tube, comprises: video signal processing means which can adjust contrast on the basis of a first control signal, adjust the pedestal level of a video signal to the black level irrespective of input of the video signal and output the signal, adjust brightness on the basis of a second control signal, and adjust the pedestal level to gray level and output the signal; a clamp capacitor having a first electrode connected to the output terminal of the video signal processing means and a second electrode connected to a cathode of the cathode ray tube; a clamp resistor connected between a predetermined power source and the connection point between the second electrode of the clamp capacitor and the cathode; a rectifying element provided so that a forward direction is set from the connection point between the second electrode of the clamp capacitor and the cathode toward the reference potential; cut-off control means for adjusting the amount of current discharging from the clamp capacitor to the reference potential in accordance with a third control signal to keep the cathode voltage to a predetermined voltage; and current measuring means for outputting the first control signal to the video signal processing means to output a signal of black level when receiving an enforced adjustment instruction, measuring the current flowing from the clamp capacitor through the rectifying element to the reference potential as a cathode current at the time of the black level signal, holding the current value thus measured, outputting the first and second control signals to the video signal processing means to output a signal of gray level, measuring the current flowing from the clamp capacitor through the rectifying element to the reference potential as a cathode current at the time of the gray level signal, taking the difference between the measured current value at the gray level time and the held measured current value at the black level time, comparing the differential value thus taken with a predetermined set value, and outputting the third control signal to the cut-off control means so that the differential value is equal to the set value.

According to the present invention, the current measuring means measures the current while averaging the current at a vertical period.

According to the present invention, the current measuring means performs the measurement of the cathode current averaged at the vertical period at a specific timing of the vertical period.

According to the present invention, upon receiving the enforced adjustment instruction, the current measuring means outputs the first control signal to perform the current measurement when a preset time elapses from the time at which power is turned on.

According to the present invention, horizontal and vertical deflection systems of the display are set to any fixed frequencies when the enforced adjusting instruction is made.

According to the present invention, the set value set by the current measuring means is changeable from the outside.

According to the present invention, the current measuring means generates the third control signal on the basis of the differential value thus obtained and outputs the third control signal to the cut-off control means at other times than the time at which the enforced adjustment instruction is made.

According to the present invention, when the enforced adjusting instruction is made to the current measuring means from the external, the first control signal is output from the current measuring means to the video signal processing means.

At this time, for example, in order to exclude the drift of the power-on, the first control signal is output when a preset time elapses from the power-on time.

In the video signal processing means, the contrast is reduced upon reception of the first control signal, and signal whose pedestal level is black level is output irrespective of input of video signals. This output signal is applied to the cathode of CRT through the clamp capacitor.

The clamp operation is carried out by the action of the clamp capacitor, the rectifying element, etc. At this time, the cathode current is charged into or discharged from the clamp capacitor. The discharge current flowing from the clamp capacitor through the rectifying element to the reference potential is measured as cathode current by the current measuring means.

When the cathode current is measured, the averaged cathode current is measured at a specific timing of a vertical period, for example.

Further, in the current measuring means, the current value measured is compared with a predetermined set value, and a second control signal is output to the cut-off control means so that the measured value is equal to the set value.

According to the present invention, when the enforced adjusting instruction is made to the current measuring means from the external, the first control signal is output from the current measuring means to the video signal processing means.

At this time, for example, in order to exclude the drift of the power-on, the first control signal is output when a preset time elapses from the power-on time.

In the video signal processing means, the contrast is reduced upon reception of the first control signal, and signal whose pedestal level is black level is output irrespective of input of video signals. This output signal is applied to the cathode of CRT through the clamp capacitor.

The clamp operation is carried out by the action of the clamp capacitor, the rectifying element, etc. At this time, the cathode current effected by leak current or the like is charged into or discharged from the clamp capacitor. The discharge current flowing from the clamp capacitor through the rectifying element to the reference potential is measured as cathode current by the current measuring means, and this measured value is temporarily held.

Next, the second control signal as well as the first control signal is output from the current measuring means to the video signal processing means, whereby the brightness adjustment is carried out in the video signal processing means and a signal whose pedestal level is adjusted to gray level is output.

Consequently, the current flowing from the clamp capacitor at the time of the gray level signal through the rectifying element to the reference potential is measured as cathode current by the current measuring means.

The differential value between the measured current value at the gray level time and the measured current value at the black level time held is determined.

That is, in this case, the detection of the cathode current is carried out by a two-point measurement of the cut-off of the cathode current and a current point higher than the cut-off.

In the current measuring means, the differential value thus obtained is compared with a predetermined set value, and a third control signal is output to the cut-off control means so that the differential value is equal to the set value.

DESCRIPTION OF THE PREFERRED EMBODIMENTS

Figure 1:
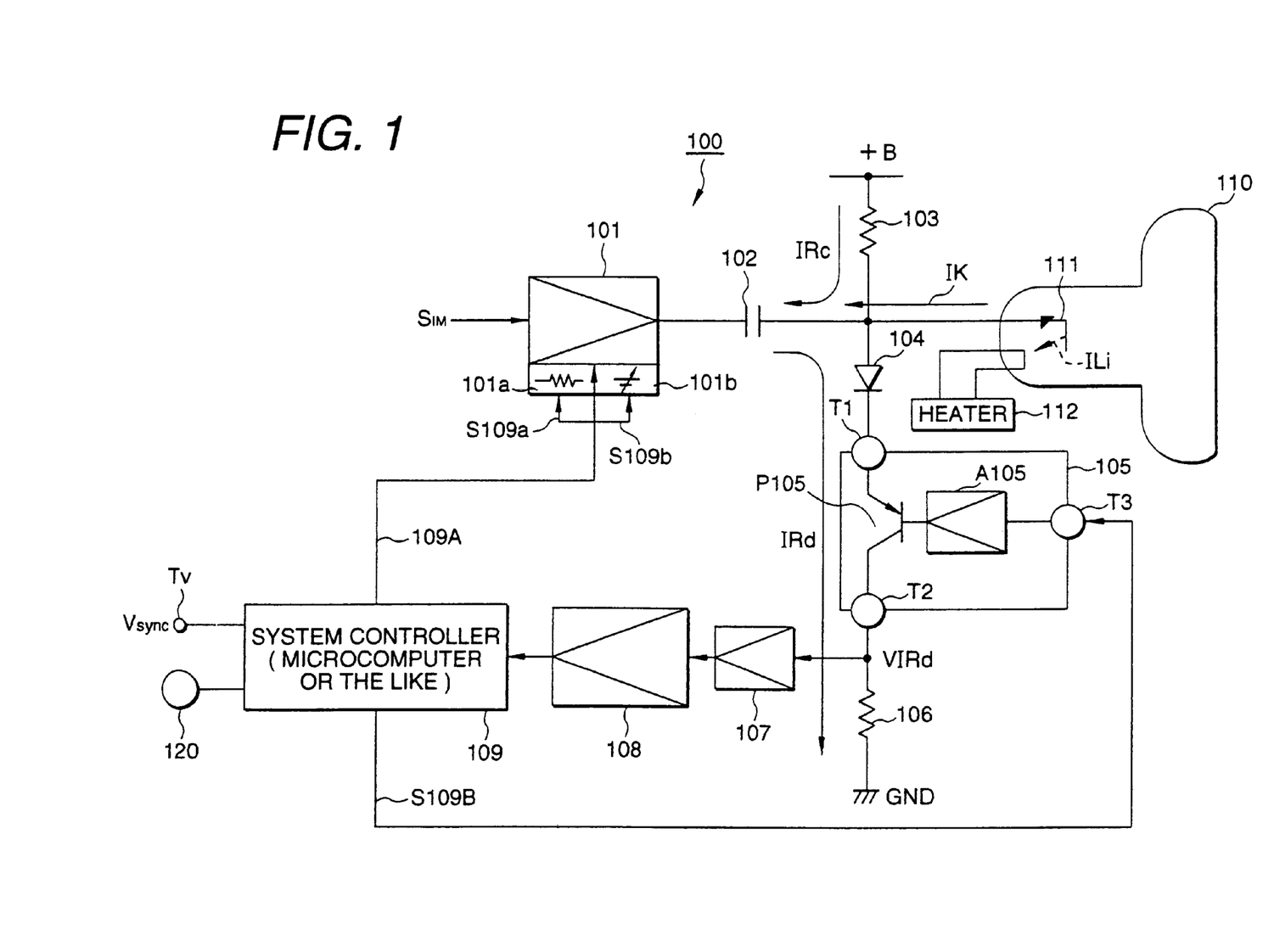
FIG. 1 is a circuit diagram showing an embodiment of a cut-off adjusting apparatus of the present invention.

FIG. 1 is a circuit diagram showing an embodiment of a cut-off adjusting apparatus according to the present invention.

As shown in FIG. 1, a cut-off adjusting apparatus 100 comprises a video amplifier 101, a cathode voltage clamp capacitor 102, a cathode voltage clamp resistor 103, a diode 104, a cut-off control amplifier 105 for setting a cut-off voltage (cut-off operating point) of CRT 110, a cathode current detecting resistor 106, a peak detecting filter 107, an analog/digital converter (ADC) 108 and a system controller 109 such as a microcomputer.

Further, 111 represents a cathode of CRT 110, 112 represents a heater for the cathode 111, and 120 represents a cut-off adjusting switch.

In this embodiment, the current measuring means is constructed by the cathode current detecting resistor 106, the peak detecting filter 107, ADC 108 and the system controller 109.

The video amplifier 101 amplifies an input video signal SIM at a predetermined gain and outputs it to the clamp capacitor 102.

The video amplifier 101 has at least a contrast adjusting volume 101a and a brightness adjusting volume 101b.

The contrast adjusting volume 101a is controlled on the basis of a control signal S109a as a first control signal by the system controller 109. The brightness adjusting volume 101b is likewise controlled on the basis of a control signal S109b as a second control signal by the system controller 109.

The output of the video amplifier 101 is connected to a first electrode of the clamp capacitor 102, and a second electrode of the capacitor 102 is connected to the cathode 111, one end of the clamp resistor 103 and the anode of the diode 104.

The other end of the clamp resistor 103 is connected to +B voltage source, and the cathode of the diode 104 is connected to a first terminal T1 of the cut-off control amplifier 105.

The cut-off control amplifier 105 has an amplifier A105 and a pnp type transistor P105, and in order to set the cut-off voltage (cut-off operating point) of CRT 110, it fixes the voltage of the first terminal T1 to any voltage in accordance with a control signal S109B as the third control signal by the system controller 109.

In the cut-off control amplifier 105, the emitter of the transistor P105 is connected to the first terminal T1, the collector is connected to the second terminal T2 and the base is connected to the third terminal T3 through the amplifier A105.

The cathode current detecting resistor 106 is connected between the second terminal T2 connected to the collector of the transistor P105 and the ground line GND.

The peak detecting filter 107 smoothes (averages) the voltage generated at the cathode current detecting resistor 106 at the vertical period, and then outputs it to ADC 108.

The peak detecting filter 107 has several fields as a time constant thereof.

ADC 108 measures the output voltage of the peak detecting filter 107 at a specific timing synchronized with the vertical period, and outputs the measured value as digital data to the system controller 109.

The cut-off adjusting switch 120 and the input terminal Tv for a vertical synchronous signal Vsync are connected to the system controller 109.

The system controller 109 is set to an enforced adjusting mode (upon receiving an enforced adjusting instruction) when the cut-off adjusting switch 120 is turned on, and first outputs the control signal S109a to the video amplifier 101 during the vertical period to control the contrast adjusting volume 101a, whereby a signal corresponding to a so-called mute state in which the output has no video signal and the pedestal level is black level irrespective of input of video signals is output and the cathode current at this time is detected.

Subsequently, the system controller 109 outputs the control signal S109b to the video amplifier 101 in addition to the control signal S109a to control the brightness adjusting volume 101b so as to output a signal corresponding to a state in which no video signal is contained in the output and the brightness level is gray irrespective of input of video signals, and the cathode current at this time is detected.

That is, in detecting the current, the system controller 109 measures the current at two points, namely when the cathode current is cut off and at higher current than when the cathode current is cut off. The differential value therebetween is determined, this measurement value is compared with a preset initial set value and the control signal S109B is output to the third terminal T3 of the cut-off control amplifier 105 so that the measurement value is equal to the initial set value.

The system controller 109 also may use the variation amount thus obtained as a correction value for the subsequent cut-off adjustment control of CRT 110, for example, in accordance with a using manner of a user on the basis of an instruction from the external.

Next, the detection principle of the cathode current on the basis of the control of the system controller 109 described above will be described in connection with FIGS. 1 and 2.

Figure 2A:
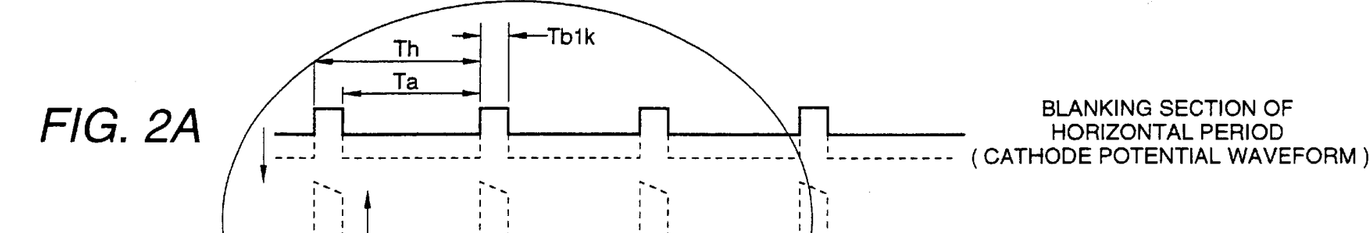
FIG. 2 is a timing chart at the time of cathode current detection of the cut-off adjustment apparatus according to the present invention.

FIG. 2 is a timing chart at the time when the cathode current is detected, FIG. 2A shows a cathode potential waveform, B shows a cathode current detection waveform at the resistor 106, C shows a potential waveform of the peak detecting filter 107, D shows the waveform of the vertical synchronous signal, E shows an input waveform of ADC 108 (at the time of gray color: second state), F shows an input waveform of ADC 108 (at the time of black color: first state), and G shows the measurement timing waveform of ADC 108.

In the following description, as shown in FIG. 2A, the time of one horizontal period is represented by Th, the blanking time of the horizontal period is represented by Tb1k, and the remaining time obtained by subtracting the blanking time from the one horizontal period is represented by Ta.

Further, the resistance value of the clamp resistor 103 is represented by Rc, the resistance value of the cathode current detecting resistor 106 is represented by Rd, the current from the clamp resistor 103 is represented by IRc, the current when electrons are irradiated from the cathode 111 to the tube face is represented by Ik, the leak current from the cathode 111 to a heater 112, etc. is represented by ILi, and the current which is discharged from the clamp capacitor 102 and flows through the diode 104 to the cathode current detecting resistor 106 is represented by IRd. The leak current ILi actually takes a negative value with respect to the current Ik from the cathode 111.

Within the time of Ta, the current IRc from the clamp resistor 103, the current Ik from the cathode 111 and the quantity of electricity Qc charged in the clamp capacitor 102 by the leak current ILi are given from the following equation:

[Equation 1]

$$Qc=(IRc+Ik+ILi)*Ta \tag{1}$$

The clamp operation of the cathode potential is an operation of discharging the quantity of electricity Qc charged in the clamp capacitor 102 within the time of Tb1k, so that IRd can be approximately expressed by the following equation.

[Equation 2]

$$IRd=Qc/Tb1k \tag{2}$$

Accordingly, the voltage VIRd occurring at the cathode current detecting resistor 106 is given from the following equation.

[Equation 3]

$$VIRd=IRd*Rd=Rd*(IRc+Ik+ILi)*Ta/Tb1k \tag{3}$$

Here, if Tb1k, Ta, Th are set to any fixed value and the voltage of the first terminal T1 of the CRT cut-off control amplifier 105 is set to any fixed value in order to detect the cathode current, variation occurring in the measuring system is due to two factors of the current Ik and the leak current ILi from the cathode 111.

Since deterioration and time-variation of each amplifier, resistor, capacitor are very small, it is not necessary to take them into consideration.

Figures 2B, 2C:
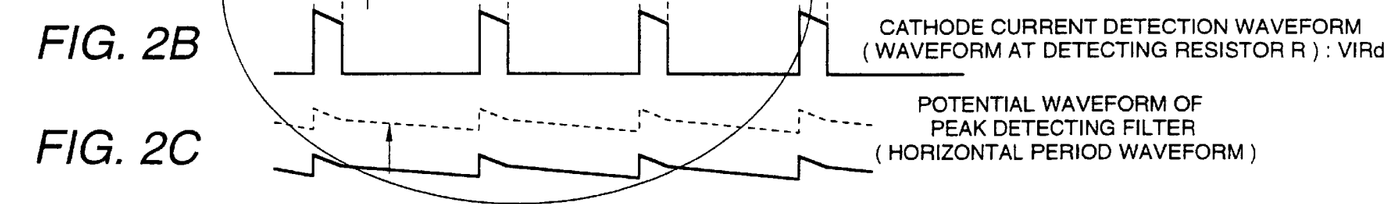
Figures 2D, 2E, 2F:
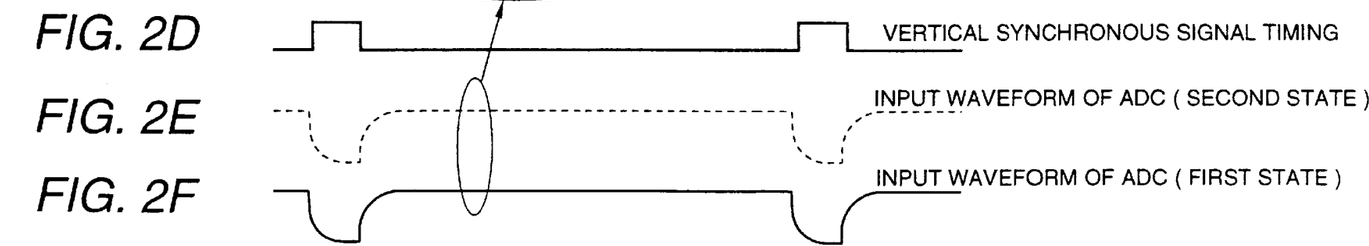

If the voltage value VIRd shown in the above equation (3) is filtered in the peak detecting filter 107, the waveform as shown in FIG. 2C can be obtained.

Figure 2G:
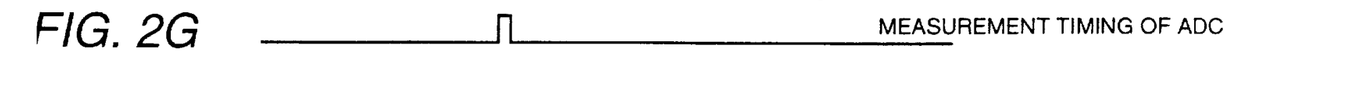

This voltage is measured by using ADC 108 at a timing synchronous with the vertical period as shown in FIG. 2G.

The measurement value of ADC 108 is input as digital data to the system controller 109, and temporarily held as a value containing the current Ik and ILi described above.

Here, the control signal S109b is output from the system controller 109 to the video amplifier 101 to control the brightness and vary the brightness.

Accordingly, the value indicated by a solid line in FIG. 2 is varied to a value indicated by a dotted line (herein, it is shown that the value is varied so as to be bright (color gray)).

Variation of the cathode voltage occurring due to variation of the brightness takes a fixed value as described previously, so that the current value IRc which occurs due to this variation and flows into the clamp resistor 103 can be calculated.

Representing the potential variation of the cathode occurring due to the variation of the brightness by $\Delta Vk$ and representing the increment of the cathode current at this time by $\Delta Ik$, the voltage VIRd (BRTup) occurring at the cathode current detecting resistor 106 is given from the following equation by the same calculation as the equations (1), (2), (3).

[Equation 4]

$$VIRd\ (BRTup)=Rd*(IRc+\Delta Vk/Rc+Ik+\Delta IK+ILi)*Ta/Tb1k \tag{4}$$

Subtracting the previously held value of the equation (3) from the value of the equation (4), the current value when electrons are irradiated onto the tube face of the CRT display from cathode 111 can be calculated.

The current value Ikb thus irradiated is given from the following equation.

[Equation 5]

$$Ikb = (VIRd\ (BRTup) - VIRd)/Rd = (\Delta Vk/Rc + \Delta IK) * Ta/Tb1k \quad (5)$$

The value of $\Delta Vk/Rc$ in the equation (5) is determined by the calculation, so that $\Delta Ik$ can be measured.

Figure 3:
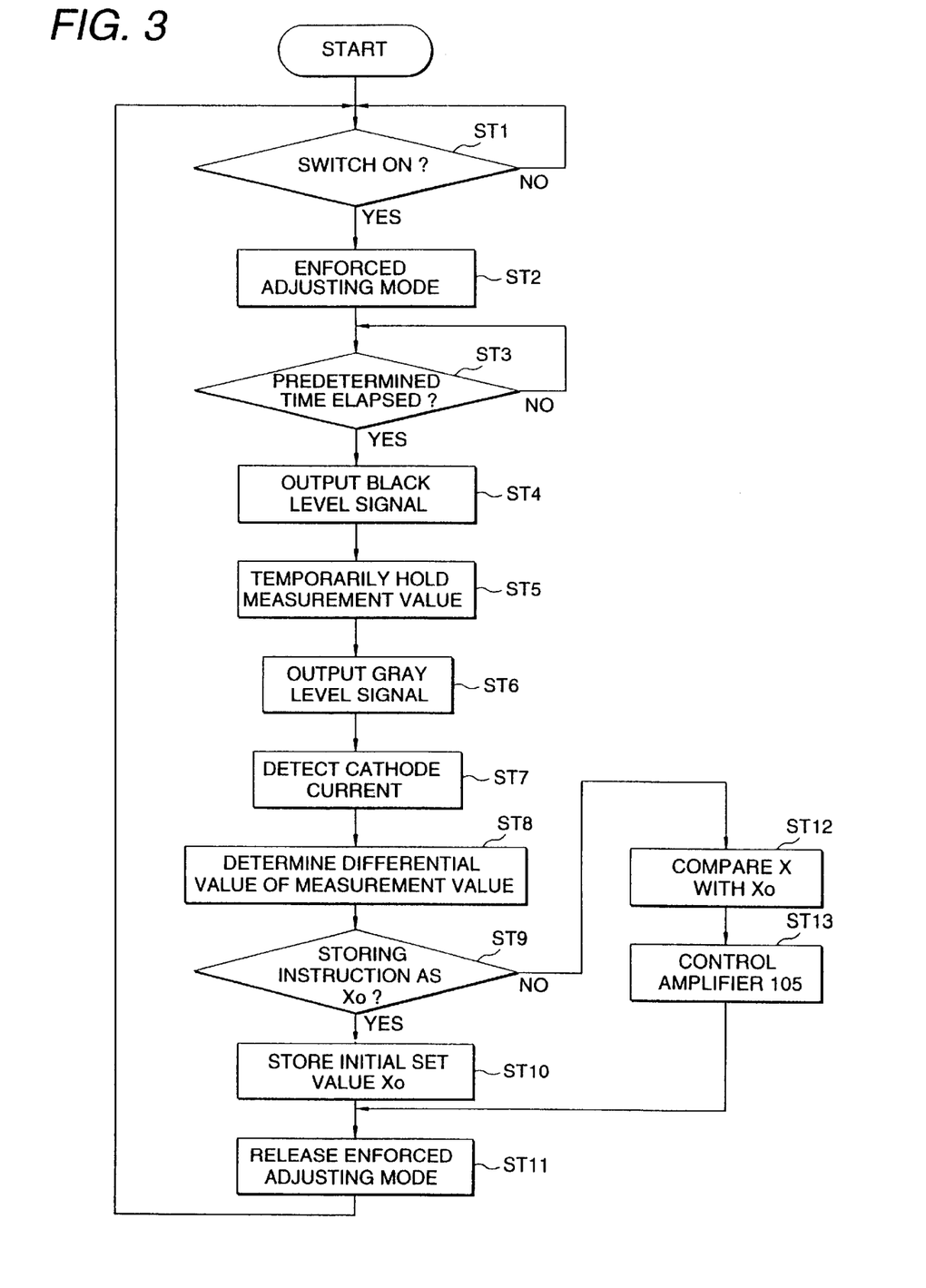
FIG. 3 is a flowchart showing the operation of the cathode current control in the system controller according to the present invention.

Next, the operation of the cathode current control (cut-off adjustment) of the apparatus shown in FIG. 1 will be described in connection with the flowchart of FIG. 3 while concentrating on the control operation of the system controller 109.

The deflection system of the display (not shown) is set to any fixed frequency (horizontal, vertical).

First, the system controller 109 judges whether the cut-off adjustment switch 120 is turned on by an operator (ST1).

If it is judged in step ST1 that the cut-off adjustment switch 120 is turned on, the enforced adjustment mode is set (ST3).

Subsequently, in order to exclude the drift of the power-on of the CRT 110, it is judged whether a predetermined time in which the system has been set to a sufficient stable state from the power-on time, for example, 30 minutes has elapsed (ST3).

If it is judged in step ST3 that the predetermined time has elapsed, the control signal S109a is first output to the video amplifier 101 during the vertical period to control the contrast adjustment volume 101a, thereby outputting the signal corresponding to a so-called mute state in which the output has no video signal and the pedestal level is black level irrespective of input of the video signal SIM (ST4).

Accordingly, in the peak detecting filter 107, the voltage occurring at the cathode current detecting resistor 106 is smoothened (averaged) at the vertical period, and then input to ADC 108.

In ADC 108, the output voltage of the peak detecting filter 107 is measured at a specific timing synchronized with the vertical period, and the measurement value thereof is input to the system controller 109 as digital data.

If there is any leak current, the system controller 109 detects the cathode current containing the leak current on the basis of the digital data, and temporarily holds this value (ST5).

Next, in addition to the control signal S109a, the system controller 109 outputs the control signal S109b to the video amplifier 101 to control the brightness adjustment volume 101b, thereby outputting a signal corresponding to a state that the output has no video signal and the brightness level is set to gray irrespective of input of the video signal (ST5).

The cathode current at this time is detected from the digital data by ADC 108 (ST7).

The difference between the current value obtained in step ST7 and the current value held in step ST5 is calculated (ST8).

Accordingly, the cathode current in which the amount of the leak current is offset can be obtained, and for example if there is any instruction of storing this current value as an initial set value X0 of the cathode current of CRT 110 (ST9), it is stored in a storage device (not shown) (ST10).

The detection of the cathode current is carried out once, for example at the shipping time or the like after the normal cut-off adjustment of CRT 110 is carried out, and this value is stored.

Thereafter, the system controller 109 releases the enforced adjustment mode (ST11).

On another day, the same operation as the steps ST1 to ST8 is carried out, and the system controller 109 compares the initial set value X0 stored in the storage device with the cathode current value X from which the amount of the leak current is offset (ST12).

If both the values are different as a result of the comparison, the control signal S190B is output to the cut-off control amplifier 105 so that the detected cathode current value X is equal to the initial set value X0 (ST13).

Specifically, when the detected cathode current value X is larger than the initial set value X0, the system controller 109 outputs the control signal S109B so that the potential of the first terminal T1 of the cut-off control amplifier 105 of CRT 110 increases in the form of DC (direct current).

On the other hand, when the detected cathode current value X is smaller than the initial set value X0, the system controller 109 outputs the control signal S109B so that the potential of the first terminal T1 of the cut-off control amplifier 105 of CRT 110 decreases in the form of DC.

Thereafter, the system controller 109 releases the enforced adjustment mode (ST11).

The system controller 109 uses the variation amount thus obtained as a correction value for the subsequent cut-off control of CRT 110, for example, in accordance with a using manner of a user on the basis of an instruction from the external.

Through the above control, the variation of the cathode current due to the time variation of CRT 110 can be suppressed to the minimum level.

According to this embodiment, the following effects can be obtained because there is provided a system controller 109 in which when the cut-off adjustment switch 120 is turned on, the enforced adjustment mode is set, during the vertical period, the control signal S109a is first output to the video amplifier 101 to control the contrast adjustment volume 101a and output such a signal that the output has no video signal and the pedestal level is the black level irrespective of input of a video signal, the cathode current averaged at this time is detected, the control signal S109b is output to the video amplifier 101 in addition to the control signal S109a to control the brightness adjustment volume 101b, thereby outputting such a signal that the brightness level is set to a gray state irrespective of the input of the video signal, the cathode current averaged at this time is detected, the difference therebetween is determined, the measurement value thereof and a predetermined initial set value are compared with each other, and the control signal S109B is output to the third terminal T3 of the cut-off control amplifier 105 so that the measurement value is equal to the initial set value.

1) It is unnecessary to prepare for a specific cathode current detecting signal.

2) The effect of dynamic focus, etc. is very small.

3) The effect of leak current on the heater of the cathode, etc. is very small (it is negligible through the subtraction process).

4) Since the measurement at the vertical period is sufficient, no high-speed response characteristic of ADC is required.

Accordingly, the variation of the cathode current due to the time-variation of CRT can be corrected with high precision.

As described above, according to the present invention, no specific signal source is required to detect the cathode current.

Further, since the detection of the cathode current is carried out at a relatively low frequency of the vertical period, ADC constituting the current measuring means may be operated at low speed, and thus the cost can be reduced.

Still further, an external disturbance factor such as dynamic focus can be excluded because of the measurement of the vertical period, and the cathode current measurement can be performed with high precision, so that there is an advantage that the high-precision control can be performed.

Accordingly, the variation of the cathode current due to the time-variation of CRT can be corrected with high precision.

With respect to the support of the time-variation of CRT, the effect is larger in a region having small cathode current, that is, in the control of the cut-off side.

What is claimed is:

1. A cut-off adjusting apparatus for adjusting a cut-off of a cathode ray tube display receiving an input video signal, comprising:

video signal processing means for adjusting at least a contrast based on a first control signal, and for adjusting a pedestal level of a video signal to a black level irrespective of the input video signal and producing an output signal at an output terminal;

a clamp capacitor having a first electrode connected to the output terminal of said video signal processing means and a second electrode connected to a cathode of said cathode ray tube;

a rectifying element connected so that a forward direction thereof is set from a connection point between said second electrode of said clamp capacitor and said cathode toward a reference potential;

cut-off control means for adjusting an amount of current discharging from said clamp capacitor to the reference potential in accordance with a second control signal so as to maintain a cathode voltage at a predetermined voltage; and current measuring means for outputting the first control signal to said video signal processing means so as to output a black level signal when receiving an enforced adjustment instruction and for measuring a current flowing from said clamp capacitor through said rectifying element to the reference potential as a cathode current at a time of the black level signal.

2. The cut-off adjusting apparatus as claimed in claim 1, wherein said current measuring means measures the current by averaging the current over a vertical period of the signal.

3. The cut-off adjusting apparatus as claimed in claim 2, wherein said current measuring means performs the measurement of the cathode current averaged at the vertical period at a specific timing of the vertical period.

4. The cut-off adjusting apparatus as claimed in claim 1, wherein upon receiving the enforced adjustment instruction, said current measuring means outputs the first control signal to perform the current measurement when a preset time elapses from the time at which power is turned on.

5. The cut-off adjusting apparatus as claimed in claim 2, wherein upon receiving the enforced adjustment instruction, said current measuring means outputs the first control signal to perform the current measurement when a preset time elapses from the time at which power is turned on.

6. The cut-off adjusting apparatus as claimed in claim 3, wherein upon receiving the enforced adjustment instruction, said current measuring means outputs the first control signal to perform the current measurement when a preset time elapses from the time at which power is turned on.

7. The cut-off adjusting apparatus as claimed in claim 1, wherein horizontal and vertical deflection systems of said cathode ray tube display are set to predetermined frequencies when the enforced adjusting instruction is received.

8. The cut-off adjusting apparatus as claimed in claim 2, wherein horizontal and vertical deflection systems of said cathode ray tube display are set to predetermined frequencies when the enforced adjusting instruction is received.

9. The cut-off adjusting apparatus as claimed in claim 3, wherein horizontal and vertical deflection systems of said cathode ray tube display are set to predetermined frequencies when the enforced adjusting instruction is received.

10. The cut-off adjusting apparatus as claimed in claim 4, wherein horizontal and vertical deflection systems of said cathode ray tube display are set to predetermined frequencies when the enforced adjusting instruction is received.

11. The cut-off adjusting apparatus as claimed in claim 5, wherein horizontal and vertical deflection systems of said cathode ray tube display are set to predetermined frequencies when the enforced adjusting instruction is received.

12. The cut-off adjusting apparatus as claimed in claim 6, wherein horizontal and vertical deflection systems of said cathode ray tube display are set to predetermined frequencies when the enforced adjusting instruction is received.

13. A cut-off adjusting apparatus for adjusting the cut-off of a cathode ray tube display receiving an input video signal, comprising:

video signal processing means for adjusting at least a contrast based on a first control signal, and for adjusting aa pedestal level of a video signal to a black level irrespective of the input video signal and producing an output signal at an output terminal;

a clamp capacitor having a first electrode connected to the output terminal of said video signal processing means and a second electrode connected to a cathode of said cathode ray tube;

a rectifying element connected so that a forward direction thereof is set from a connection point between said second electrode of said clamp capacitor and said cathode toward a reference potential;

cut-off control means for adjusting an amount of current discharging from said clamp capacitor to the reference potential in accordance with a second control signal so as to maintain a cathode voltage at a predetermined voltage; and current measuring means for outputting the first control signal to said video signal processing means so as to output a black level signal when receiving an enforced adjustment instruction, for measuring a current flowing from said clamp capacitor through said rectifying element to the reference potential as a cathode current at time of the black level signal, for comparing a measured current value with a predetermined set value, and for outputting the second control signal to said cut-off control means so that the measured value current is equal to the set value.

14. The cut-off adjusting apparatus as claimed in claim 13, wherein said current measuring means measures the current by averaging the current over a vertical period of the video signal.

15. The cut-off adjusting apparatus as claimed in claim 14, wherein said current measuring means performs the measurement of the cathode current averaged at the vertical period at a specific timing of the vertical period.

16. The cut-off adjusting apparatus as claimed in claim 13, wherein upon receiving the enforced adjustment instruction, said current measuring means outputs the first control signal to perform the current measurement when a preset time elapses from the time at which power is turned on.

17. The cut-off adjusting apparatus as claimed in claim 14, wherein upon receiving the enforced adjustment instruction, said current measuring means outputs the first control signal to perform the current measurement when a preset time elapses from the time at which power is turned on.

18. The cut-off adjusting apparatus as claimed in claim 15, wherein upon receiving the enforced adjustment instruction, said current measuring means outputs the first control signal to perform the current measurement when a preset time elapses from the time at which power is turned on.

19. The cut-off adjusting apparatus as claimed in claim 13, wherein horizontal and vertical deflection systems of said cathode ray tube display are set to predetermined frequencies when the enforced adjusting instruction is received.

20. The cut-off adjusting apparatus as claimed in claim 14, wherein horizontal and vertical deflection systems of said cathode ray tube display are set to predetermined frequencies when the enforced adjusting instruction is received.

21. The cut-off adjusting apparatus as claimed in claim 15, wherein horizontal and vertical deflection systems of said cathode ray tube display are set to predetermined frequencies when the enforced adjusting instruction is received.

22. The cut-off adjusting apparatus as claimed in claim 16, wherein horizontal and vertical deflection systems of said cathode ray tube display are set to predetermined frequencies when the enforced adjusting instruction is received.

23. The cut-off adjusting apparatus as claimed in claim 17, wherein horizontal and vertical deflection systems of said cathode ray tube display are set to predetermined frequencies when the enforced adjusting instruction is received.

24. The cut-off adjusting apparatus as claimed in claim 18, wherein horizontal and vertical deflection systems of said cathode ray tube display are set to predetermined frequencies when the enforced adjusting instruction is received.

25. A cut-off adjusting apparatus for adjusting the cut-off of a cathode ray tube display receiving an input video signal, comprising:

video signal processing means for adjusting a contrast based on a first control signal, for adjusting a pedestal level of a video signal to a black level irrespective of input of the video signal and producing an output signal at an output terminal, for adjusting a brightness based on a second control signal, and for adjusting a pedestal level to a gray level and outputting an adjusted signal;

a clamp capacitor having a first electrode connected to the output terminal of said video signal processing means and a second electrode connected to a cathode of said cathode ray tube;

a clamp resistor connected between a predetermined power source and a connection point between said second electrode of said clamp capacitor and said cathode;

a rectifying element connected so that a forward direction is set from the connection point between said second electrode of said clamp capacitor and said cathode toward a reference potential;

cut-off control means for adjusting an amount of current discharging from said clamp capacitor to the reference potential in accordance with a third control signal to maintain a cathode voltage at a predetermined voltage; and current measuring means for outputting the first control signal to said video signal processing means to output a black level signal when receiving an enforced adjustment instruction, for measuring a current flowing from said clamp capacitor through said rectifying element to the reference potential as a cathode current at a time of the black level signal, for holding a current value thus measured, for outputting the first and second control signals to said video signal processing means to output a gray level signal, for measuring the current flowing from said clamp capacitor through said rectifying element to the reference potential as a cathode current at a time of the gray level signal, and for taking a difference between the measured current value at the time of the gray level signal and the held measured current value at the time of the black level signal.

26. The cut-off adjusting apparatus as claimed in claim 25, wherein said current measuring means measures the current by averaging the current over a vertical period of the video signal.

27. The cut-off adjusting apparatus as claimed in claim 26, wherein said current measuring means performs the measurement of the cathode current averaged at the vertical period at a specific timing of the vertical period.

28. The cut-off adjusting apparatus as claimed in claim 25, wherein upon receiving the enforced adjustment instruction, said current measuring means outputs the first control signal to perform the current measurement when a preset time elapses from the time at which power is turned on.

29. The cut-off adjusting apparatus as claimed in claim 26, wherein upon receiving the enforced adjustment instruction, said current measuring means outputs the first control signal to perform the current measurement when a preset time elapses from the time at which power is turned on.

30. The cut-off adjusting apparatus as claimed in claim 27, wherein upon receiving the enforced adjustment instruction, said current measuring means outputs the first control signal to perform the current measurement when a preset time elapses from the time at which power is turned on.

31. The cut-off adjusting apparatus as claimed in claim 25, wherein horizontal and vertical deflection systems of said cathode ray tube display are set to predetermined frequencies when the enforced adjusting instruction is received.

32. The cut-off adjusting apparatus as claimed in claim 26, wherein horizontal and vertical deflection systems of said cathode ray tube display are set to predetermined frequencies when the enforced adjusting instruction is received.

33. The cut-off adjusting apparatus as claimed in claim 27, wherein horizontal and vertical deflection systems of said cathode ray tube display are set to predetermined frequencies when the enforced adjusting instruction is received.

34. The cut-off adjusting apparatus as claimed in claim 28, wherein horizontal and vertical deflection systems of said cathode ray tube display are set to predetermined frequencies when the enforced adjusting instruction is received.

35. The cut-off adjusting apparatus as claimed in claim 29, wherein horizontal and vertical deflection systems of said cathode ray tube display are set to predetermined frequencies when the enforced adjusting instruction is received.

36. The cut-off adjusting apparatus as claimed in claim 30, wherein horizontal and vertical deflection systems of said cathode ray tube display are set to predetermined frequencies when the enforced adjusting instruction is received.

37. A cut-off adjusting apparatus for adjusting the cut-off of a cathode ray tube display receiving an input video signal, comprising:

video signal processing means for adjusting a contrast based on a first control signal, for adjusting a pedestal level of a video signal to a black level irrespective of the input video signal and producing an output signal at an output terminal, for adjusting a brightness based on a second control signal, and for adjusting a pedestal level to a gray level and outputting an adjusted signal;

a clamp capacitor having a first electrode connected to the output terminal of said video signal processing means and a second electrode connected to a cathode of said cathode ray tube;

a clamp resistor connected between a predetermined power source and a connection point between said second electrode of said clamp capacitor and said cathode;

a rectifying element connected so that a forward direction is set from the connection point between said second electrode of said clamp capacitor and said cathode toward a reference potential;

cut-off control means for adjusting an amount of current discharging from said clamp capacitor to the reference potential in accordance with a third control signal to keep a cathode voltage at a predetermined voltage; and current measuring means for outputting the first control signal to said video signal processing means to output a black level signal when receiving an enforced adjustment instruction, for measuring a current flowing from said clamp capacitor through said rectifying element to the reference potential as a cathode current at the time of the black level signal, for holding a measured current value, for outputting the first and second control signals to said video signal processing means to output a gray level signal, for measuring the current flowing from said clamp capacitor through said rectifying element to the reference potential as a cathode current at a time of the gray level signal, for taking a difference between the measured current value at the gray level signal time and the held measured current value at the black level signal time, for comparing a differential value thus taken with a predetermined set value, and for outputting the third control signal to said cut-off control means so that the differential value is equal to the set value.

38. The cut-off adjusting apparatus as claimed in claim 37, wherein said current measuring means measures the current by averaging the current over a vertical period of the video signal.

39. The cut-off adjusting apparatus as claimed in claim 38, wherein said current measuring means performs the measurement of the cathode current averaged at the vertical period at a specific timing of the vertical period.

40. The cut-off adjusting apparatus as claimed in claim 37, wherein upon receiving the enforced adjustment instruction, said current measuring means outputs the first control signal to perform the current measurement when a preset time elapses from the time at which power is turned on.

41. The cut-off adjusting apparatus as claimed in claim 38, wherein upon receiving the enforced adjustment instruction, said current measuring means outputs the first control signal to perform the current measurement when a preset time elapses from the time at which power is turned on.

42. The cut-off adjusting apparatus as claimed in claim 39, wherein upon receiving the enforced adjustment instruction, said current measuring means outputs the first control signal to perform the current measurement when a preset time elapses from the time at which power is turned on.

43. The cut-off adjusting apparatus as claimed in claim 37, wherein horizontal and vertical deflection systems of said cathode ray tube display are set to predetermined frequencies when the enforced adjusting instruction is received.

44. The cut-off adjusting apparatus as claimed in claim 38, wherein horizontal and vertical deflection systems of said cathode ray tube display are set to predetermined frequencies when the enforced adjusting instruction is received.

45. The cut-off adjusting apparatus as claimed in claim 39, wherein horizontal and vertical deflection systems of said cathode ray tube display are set to frequencies predetermined when the enforced adjusting instruction is received.

46. The cut-off adjusting apparatus as claimed in claim 40, wherein horizontal and vertical deflection systems of said cathode ray tube display are set to predetermined frequencies when the enforced adjusting instruction is received.

47. The cut-off adjusting apparatus as claimed in claim 41, wherein horizontal and vertical deflection systems of said cathode ray tube display are set to predetermined frequencies when the enforced adjusting instruction is received.

48. The cut-off adjusting apparatus as claimed in claim 42, wherein horizontal and vertical deflection systems of said cathode ray tube display are set to predetermined frequencies when the enforced adjusting instruction is received.

49. The cut-off adjusting apparatus as claimed in claim 37 wherein the predetermined set value of said current measuring means is changeable by a user of the apparatus.

50. The cut-off adjusting apparatus as claimed in claim 37, wherein said current measuring means generates the third control signal based on the differential value thus obtained and outputs the third control signal to said cut-off control means at times other than the time at which the enforced adjustment instruction is received.

* * * * *